United States Patent [19]

Tomforde

[11] Patent Number: 4,932,712
[45] Date of Patent: Jun. 12, 1990

[54] SIDE BODY SECTION FOR MOTOR VEHICLES

[75] Inventor: Johann Tomforde, Sindelfingen, Fed. Rep. of Germany

[73] Assignee: Daimler-Benz AG, Stuttgart, Fed. Rep. of Germany

[21] Appl. No.: 268,261

[22] Filed: Nov. 7, 1988

[30] Foreign Application Priority Data

Nov. 6, 1987 [DE] Fed. Rep. of Germany ....... 3737736

[51] Int. Cl.$^5$ .............................................. B60J 10/06
[52] U.S. Cl. .................................... 296/146; 296/152; 296/201; 296/202; 49/502
[58] Field of Search ............... 296/146, 152, 201, 202; 49/502

[56] References Cited

U.S. PATENT DOCUMENTS 4,591,204  5/1986  Gallitzendoerfer et al. ... 296/146 X
4,688,847  8/1987  Freudenberg ........................ 296/146

FOREIGN PATENT DOCUMENTS 99451    4/1983  European Pat. Off. .
1743111  1/1957  Fed. Rep. of Germany .
3119595  2/1982  Fed. Rep. of Germany .
3313658  10/1984 Fed. Rep. of Germany .
3444898  3/1986  Fed. Rep. of Germany ...... 296/146

Primary Examiner—Margaret A. Focarino
Assistant Examiner—Andrew C. Pike
Attorney, Agent, or Firm—Evenson, Wands, Edwards, Lenahan & McKeown

[57] ABSTRACT

A side body section for motor vehicles is disclosed in a whole surface flush side glazing unit where even the region of the center column is covered by a transparent shield. In the side body section according to the invention, a transparent shield is fastened to a door frame which is prolonged by the width of the center column. This produces only one separating line between the two side doors. The glass or synthetic glass shield is arranged in the plane of the side windows. In the region of the shield, the door frame has recesses which permit the fastening of receiver units for locking systems or the like to the inside of the shield.

9 Claims, 2 Drawing Sheets

SIDE BODY SECTION FOR MOTOR VEHICLES

BACKGROUND AND SUMMARY OF THE INVENTION

The invention relates to a side body section for motor vehicles having two doors on each side and lowerable glass windows arranged flush with the outer vehicle skin and with a glass or synthetic glass provided between the windows to cover a center column.

In a known side body section of this type disclosed in German Published Unexamined patent application (DE-OS) No. 3,313,658 the center column is covered by a transparent shield which is fastened to the center column by means of a support element. The interval of the support element from the center column is adjustable. In the known side body section, separating lines extend between the center column and the side doors on both sides of the shield. This causes a greater production outlay, particularly in the case of side doors which engage around the roof section. The separating lines located juxtaposed in the region of the vehicle roof are also aesthetically disadvantageous.

An underlying object of the invention is to construct a side body section so that it can be produced with a low production outlay.

This object is achieved in a side body section of the type initially mentioned by providing an arrangement wherein the shield is fastened to a door frame of the front side door, said door frame being prolonged to the rear into the region of the center column. In the side body section according to the invention a transparent shield is fastened to one of the side doors. This arrangement produces a separating line between the side doors which extends vertically over the full door height. The production outlay is reduced because only one separating line is present between the side doors.

In an advantageous embodiment of the invention the door frame of the driver door is prolonged so far to the rear that it extends across the full width of the center column. The center column is covered in the region of the window pane of the driver door by a shield which is fastened on the door frame. Thus, a window front is created which extends from the A-column to the C-column and terminates flush with the body surface.

According to certain preferred embodiments, joint seal elements are provided between the shield and the side windows. This prevents water from penetrating into the window shafts of the driver door and/or rear side door.

According to certain preferred embodiments, recesses are provided in the door frame of the driver door, which permit the fastening of receiver units for locking systems or the like on the inside of the shield.

Other objects, advantages, and novel features of the present invention will become apparent from the following detailed description of the invention when considered in conjunction with the accompanying drawings.

DETAILED DESCRIPTION OF THE DRAWINGS

Figure 1:
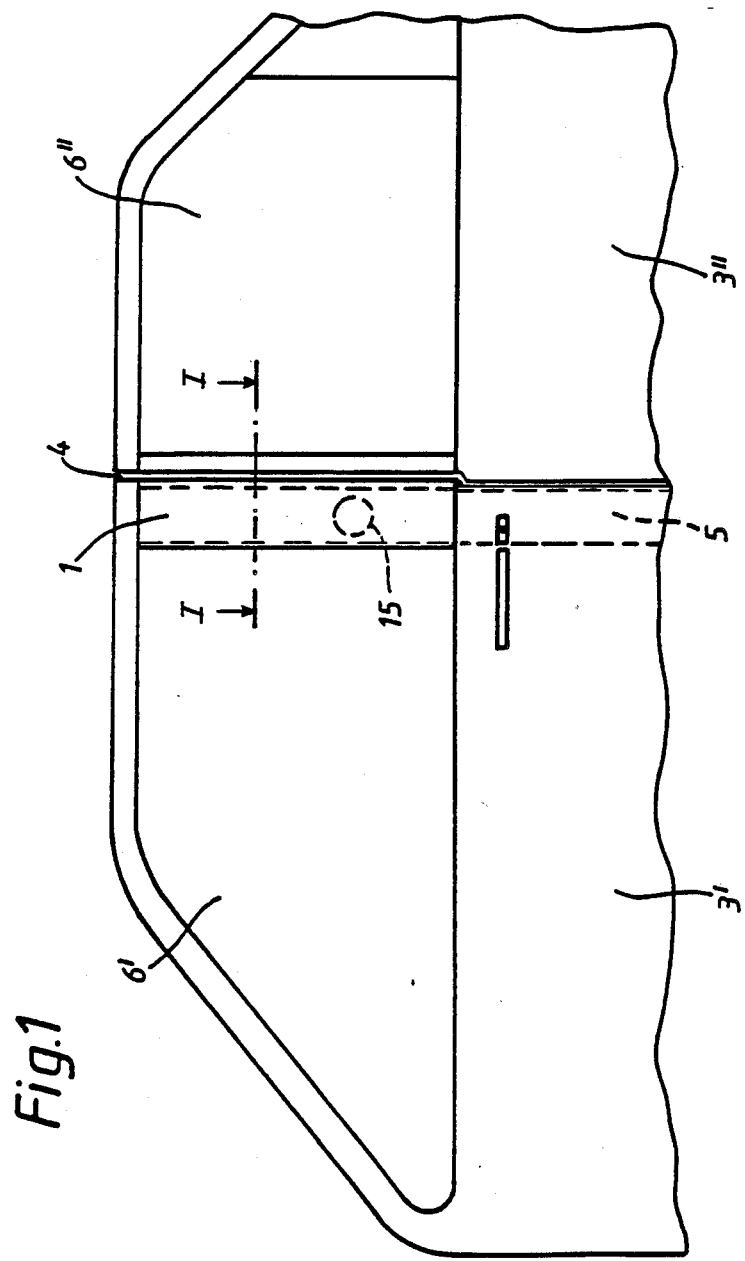
FIG. 1 is a diagrammatic partial side elevation view of an automobile with a side section constructed according to a preferred embodiment of the invention.
Figure 2:
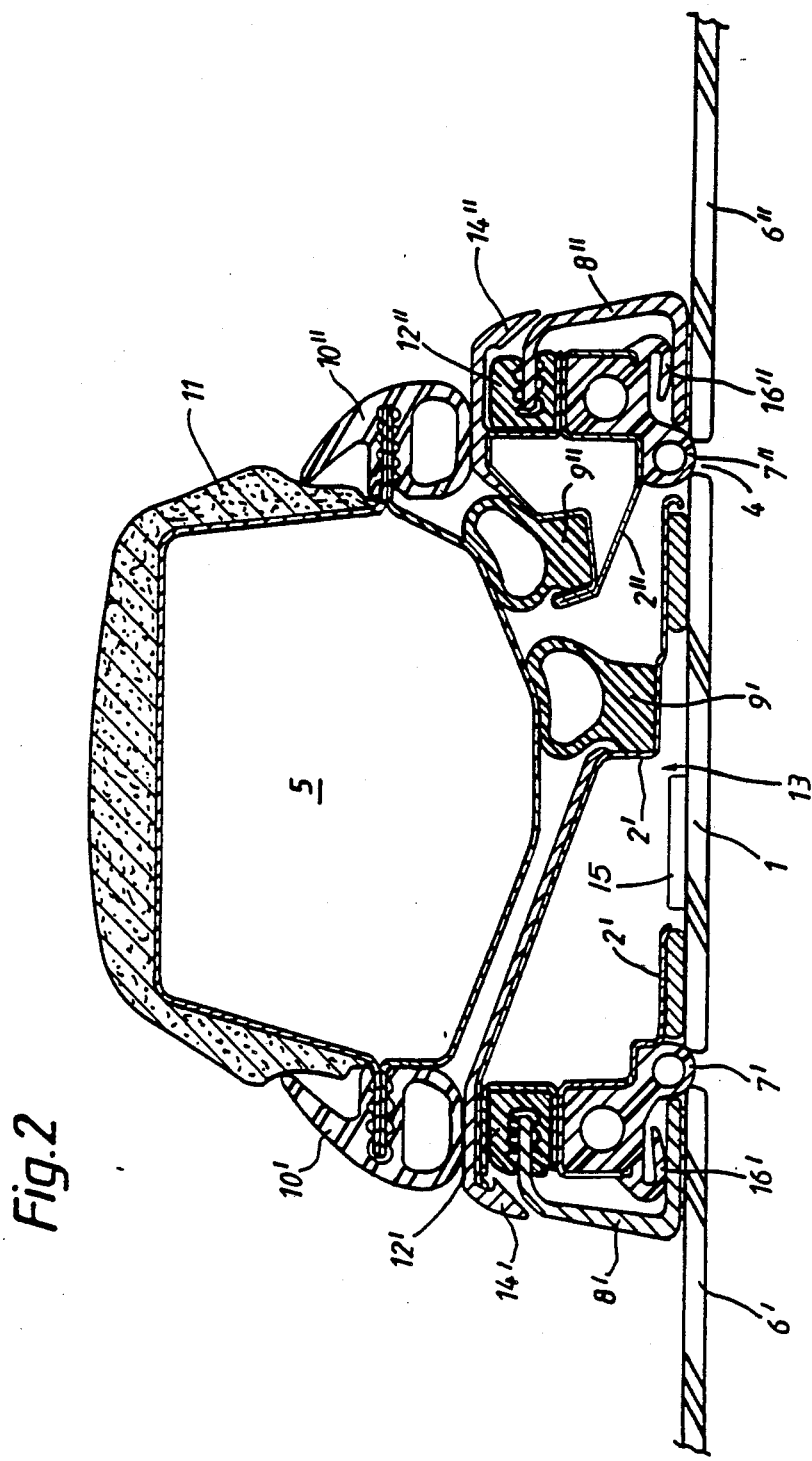
FIG. 2 shows a section along the line I—I of FIG. 1.

In the embodiment of the invention illustrated in FIGS. 1 and 2, a frame 2' of a driver door 3' is prolonged to a rear to extend over a width of a center column 5 and extends into a region of a rear side door 3". A shield 1, which is produced from transparent material, is arranged between lowerable side windows 6', 6". Therefore, when viewed from the side, a full surface glazed side section is created between the A-column and the C-column.

A vertically oriented separating line 4, which extends over the entire height of the side doors 3' and 3" is arranged between the driver door 3' and the rear side door 3". Since only one separating line 4 is necessary with the side body section according to the invention, expensive fitting operations are eliminated, particularly in the case of side doors which engage round the roof section. An aesthetically advantageous side body section is also obtained by one separating line.

The arrangement according to the invention of the shield 1 is shown in FIG. 2. The shield 1 is arranged in a plane of the lowerable side windows 6', 6", a surface of which merges flush into an external skin of a vehicle body. The shield 1 is fastened by means of a bonded joint to the door frame 2' of the driver door 3', which is continued into the region of a door frame 2" of the rear side door 3". The joints provided between the shield 1 and the side windows 6" are sealed by joint seal elements 7', 7" which are fastened to the door frames 2', 2". The joint seal elements 7' and 7" have sealing lips 16' and 16" which abut an inside of U-shaped window guide profiles 8' and 8", so that water is prevented from penetrating into the window shafts of the side doors 3' and 3". The side window 6' and 6" is fastened in known manner to one member of the window guide profile 8' and 8", whereas the other member is guided in a vertically arranged guide channel 12'. The side of the door frame 2', 2" facing the interior of the vehicle is provided with a door frame trim 14', 14". The sealing of the side doors 3' and 3" is effected primarily by the main seal elements 9', 9". In the case of the driver door 3' the main seal element 9' is fastened to the door frame 2' in the center of the shield 1. In the closed position the main seal element 9' is moved to the center column 5. The main seal element 9" is arranged on the door frame 2" of the rear side door 3" analogously. The flange cover element 10' and 10", which is fastened to the connection point of the center column 5 of double-shell construction, is constructed as an additional sealing means.

Recesses 13 which are provided in the door frame 2' permit the fastening of receiver units 15 on the inside of the shield 1. The receiver units 15 may be parts of a locking system or the like.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Side body section for motor vehicles having two side doors on each side, one of the two doors being a front side door and the other being a rear side door and with each door having lowerable side windows, comprising: a glass or synthetic glass shield between the side windows and located in a plane of and flush with the side windows to cover a portion of a center column when the front side door is in a closed position, wherein the shield is fastened to a door frame of the front side door, said door frame being prolonged to extend to the rear side door and between the shield and the center column to substantially overlie the portion of the center column covered by the shield and to underlie the shield, a separating joint located between the shield and the window of the rear side door and sealed by a joint seal located between a frame for the rear side door and the shield, and a main seal means connected to the front door frame to rest against a generally central area of the portion of the center column that is covered by the shield when the front side door is in the closed position.

2. Side body section according to claim 1, wherein the door frame of the front side door extends over a total width of the center column.

3. Side body section according to claim 1, wherein the shield is fastened to the door frame by means of a bonded joint.

4. Side body section according to claim 3, wherein the door frame of the front side door extends over a total width of the center column.

5. Side body section according to claim 1, wherein recess means are provided in the door frame in a region of the shield for fastening receiver units for locking systems on an inside of the shield.

6. Side body section according to claim 5, wherein the door frame of the front side door extends over a total width of the center column.

7. Side body section according to claim 5, wherein a flange cover element acting as a seal element for the front side door is arranged on the center column.

8. Side body section according to claim 1, wherein a flange cover element acting as a seal element for the front side door is arranged on the center column.

9. Side body section according to claim 8, wherein the door frame of the front side door extends over a total width of the center column.

* * * * *